United States Patent Office 2,784,211
Patented Mar. 5, 1957

2,784,211
6-CYANOACYLDEHYDROABIETIC ACIDS AND ESTERS THEREOF

Willard M. Hoehn, Wilmette, Ill., assignor to G. D. Searle & Co., Chicago, Ill., a corporation of Delaware No Drawing. Application February 1, 1956,
Serial No. 562,647

8 Claims. (Cl. 260—464)

The present invention relates to polyhydrophenanthrene compounds structurally related to dehydroabietic acid, and is specifically concerned with 6-cyanoacyldehydroabietic acids and esters thereof. The compounds of this invention can be represented by the structural formula

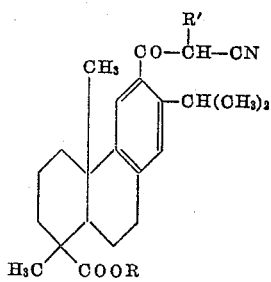

wherein R and R' are members of the group consisting of hydrogen and lower alkyl radicals. When R and R' are lower alkyl radicals in the foregoing structural formula, they can represent methyl, ethyl, propyl, butyl, amyl, hexyl, heptyl, octyl, and branched-chain isomers thereof.

The lower alkyl esters of this invention can be prepared by acylation of an alkyl dehydroabietate with a lower alkanoyl halide or a lower alkanoic acid anhydride, followed by halogenation of the reaction product and treatment of the resulting haloacyl derivative with an alkali metal cyanide, whereby the halogen atom is replaced by a cyano or nitrile group. Acylating agents suitable for use in carrying out the processes of this invention can be selected from the alkanoyl halides and alkanoic acid anhydrides of lower alkanoic acids containing at least two carbon atoms. As a representative example of the manufacture of a compound of this invention, methyl 6-acetyldehydroabietate, prepared by the aluminum chloride-catalyzed reaction of methyl dehydroabietate and acetyl chloride, is converted to methyl 6-bromoacetyldehydroabietate by reaction with bromine. Heating the bromo derivative in an aqueous alcoholic solution with an alkali metal cyanide such as sodium cyanide or potassium cyanide, suitably with the addition of a small amount of acetic acid to render the reaction mixture approximately neutral results in the formation of methyl 6-cyanoacetyldehydroabietate.

Various modifications of this process are possible. For example, by conducting the acylation of methyl dehydroabietate with a haloalkanoyl halide, representatively chloroacetyl chloride, methyl 6-chloroacetyldehydroabietate results directly and a separate halogenation step is eliminated. Reaction of this chloro derivative with an alkali metal cyanide affords the same cyano derivative whose preparation from the bromo compound is outlined hereinabove. Other alkyl cyanoacyldehydroabietates are obtained by suitable selection of the alkyl dehydroabietate and the alkanoyl halide or haloalkanoyl halide employed as an acylating agent. Thus, acylation of ethyl dehydroabietate with butyryl chloride, followed by bromination of the reaction product and treatment of the bromo derivative with potassium cyanide, yields ethyl 6-(α-cyanobutyryl)dehydroabietate.

The preferred method of manufacture for the compositions of this invention which have a free carboxylic acid group is by the hydrolysis of the alkyl 6-alkanoyldehydroabietate to the 6-alkanoyldehydroabietic acid, followed by halogenation in the acyl group to produce the α-halo derivative and replacement of the halogen atom with a cyano group by treatment with an alkali metal cyanide.

Suitable solvent media in which to carry out the reaction of the halogen derivative with the alkali metal cyanide include hydroxylic solvents and solvent mixtures containing a hydroxylic component. Thus, there can be employed an alkanol or a mixture of an alkanol and water, as well as solvent mixtures including a carboxylic acid or an enol.

The compositions of the present invention have useful pharmacological properties. Specifically, they are androgenic and anabolic agents, and their administration results in a retention and more effective utilization of metabolic nitrogen.

This invention will appear more fully from the examples which follow. These examples are set forth by way of lilustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.), distilllation pressures in millimeters (mm.) of mercury, and quantities of materials in parts by weight.

Example 1

A solution of 200 parts of methyl dehydroabietate, 720 parts of nitrobenzene, and 79.5 parts of chloroacetyl chloride is cooled to about 0-5° C. and with constant stirring, treated with a total of 170 parts of aluminum chloride added in small portions. The reaction mixture is maintained at about 5° C. for 48 hours and is then poured onto 1000 parts of ice. The aqueous layer is tested with indicator paper in order to make certain that the pH is no higher than 2. Ether (1400 parts) is added and the organic phase is washed with several portions of cold water, dried over anhydrous calcium sulfate and filtered. The ether and nitrobenzene are removed from the filtrate by distillation under reduced pressure, and the gummy residue is recrystallized several times from methanol to give purified methyl 6-chloroacetyldehydroabietate melting at 119–120° C. and having the structural formula

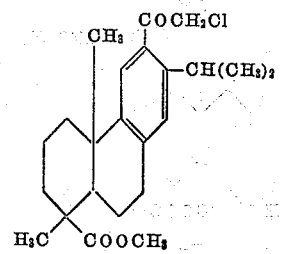

Example 2

A mixture of 9.1 parts of methyl 6-chloroacetyldehydroabietate, 6.5 parts of potassium cyanide, 12 parts of water, 60 parts of ethanol and 0.1 part of acetic acid is heated under reflux for about 3 hours. The contents of the reaction vessel are poured into 500 parts of water, and the resulting mixture is made distinctly acidic by the addition of dilute hydrochloric acid and is then distilled under reduced pressure until most of the ethanol is removed. The cooled, aqueous phase is removed by decantation, and the residual, dark oil is washed by decantation with water containing a small amount of ethanol. If crystallization does not occur spontaneously, the oily product is dissolved in about 40 parts of ether, and the resulting solution is dried, filtered, and diluted with about 35 parts of petroleum ether. Crystallization is then induced by partial evaporation of this solution. Further purification by repeated recrystallization from methanol affords methyl 6-cyanoacetyldehydroabietate melting at about 150-151° C. This compound has the structural formula

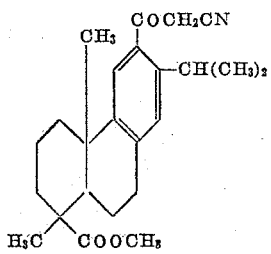

Example 3

A solution of 23 parts of bromine in 125 parts of dimethylformamide is mixed with a solution of 51 parts of methyl 6-acetyldehydroabietate in 175 parts of dimethylformamide, and the reaction mixture is stirred for 2 hours and then allowed to stand at about 25° C. for 2-3 days. The mixture is then diluted with 300 parts of water, with constant stirring, and the crystalline precipitate is collected on a filter and washed with water. When this crude product is digested with methanol and then recrystallized several times from mixtures of chloroform and methanol, there is obtained purified methyl 6-bromoacetyldehydroabietate. This compound melts at about 120-122° C.

Example 4

By the procedure of Example 2, with the substitution of 10 parts of methyl 6-bromoacetyldehydroabietate for the methyl 6-chloroacetyldehydroabietate, there is obtained the same methyl 6-cyanoacetyldehydroabietate melting at about 150-151° C.

Example 5

By the procedure of Example 1, with the substitution of 210 parts of ethyl dehydroabietate for the methyl dehydroabietate, there is obtained ethyl 6-chloroacetyldehydroabietate. Substitution of 9.4 parts of this compound for the methyl 6-chloroacetyldehydroabietate in Example 2 yields ethyl 6-cyanoacetyldehydroabietate of the structural formula

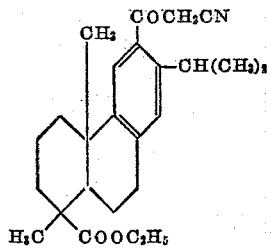

Example 6

A solution is prepared from 25 parts of methyldehydroabietate, 90 parts of nitrobenzene and 7.4 parts of propionyl chloride and cooled to about 0-5° C. Aluminum chloride (21 parts) is added in several portions, and after the reaction mixture is refrigerated at about 5° C. for 40 hours it is poured onto ice. When the aqueous layer is tested with indicator paper the pH is less than 2. About 100 parts of ether is added and the organic phase is washed with dilute sodium hydroxide solution and with several portions of water. It is then dried over anhydrous sodium sulfate and concentrated under vacuum until the ether and nitrobenzene have been removed. When the residue is subjected to a vacuum distillation at about 0.05 mm. pressure, the mixture of the propionyl derivatives of methyl dehydroabietate is collected as a very viscous oil. The principal component of this distillate, methyl 6-propionyldehydroabietate, is obtained in purified form by crystallization from ether or from methanol.

Example 7

A mixture of 1.0 part of methyl 6-propionyldehydroabietate, 30 parts of ethanol and 2 parts of potassium hydroxide is heated under reflux for about 4 hours and then concentrated by distillation to about half of its initial volume. The reaction mixture is then diluted with 100 parts of water and filtered from an insoluble residue. When the filtrate is acidified with a slight excess of dilute hydrochloric acid, 6-propionyldehydroabietic acid precipitates. This product is collected on a filter and washed with water.

Example 8

A solution of 1.8 parts of bromine in 10 parts of dimethylformamide is mixed with a solution of 4 parts of 6-propionyldehydroabietic acid in 20 parts of dimethylformamide. The contents of the reaction flask are stirred for 2 hours and then allowed to stand at room temperature for 4 days. The mixture is then diluted with 50 parts of water and the product which precipitates is collected on a filter. By recrystallization from methanol or from mixtures of chloroform and methanol, there is obtained purified 6-(α-bromopropionyl)dehydroabietic acid.

Example 9

A mixture of 5 parts of 6-(α-bromopropionyl)-dehydroabietic acid, 2.5 parts of sodium cyanide, 6 parts of water, 48 parts of isopropyl alcohol and 0.1 part of acetic acid is heated under reflux for 3 hours. The reaction mixture is poured into 300 parts of water to which a small amount of hydrochloric acid has been added, and a distillation is carried out under reduced pressure until most of the isopropyl alcohol has been removed. The oily, organic product is separated and washed by decantation with several portions of water. It is then dissolved in ether, and the ethereal solution is dried, decolorized with activated charcoal and filtered. The filtrate is evaporated to dryness. Purification of the residue by repeated recrystallization from aqueous methanol affords 6-(α-cyanopropionyl)dehydroabietic acid of the structural formula

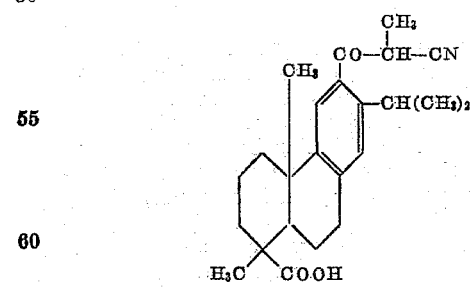

Example 10

To 12 parts of 6-acetyldehydroabietic acid in 55 parts of dimethylformamide there is added all at once a solution of 5.6 parts of bromine in 30 parts of dimethylformamide. The reaction mixture is stirred for 2 hours and then allowed to stand at room temperature for about 3 days. It is then diluted, with vigorous stirring, with 150 parts of water, and the precipitate which forms is collected and washed. By repeated recrystallization from ethanol, there is obtained purified 6-bromoacetyldehydroabietic acid. Substitution of 5 parts of this compound for the 6-(α-bromopropionyl)dehydroabietic acid in the procedure of Example 9 yields 6-cyanoacetyldehydroabietic acid of the following structural formula

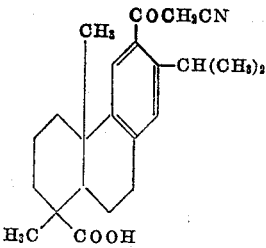

Example 11

Aluminum chloride (85 parts) is gradually added to a stirred solution of 34 parts of butyryl chloride and 100 parts of methyl dehydroabietate in 600 parts of nitrobenzene. The reaction mixture is maintained at about 5° C. during the period of addition and for 24 hours thereafter. The reaction mixture is then stirred into 650 parts of ice water, and the resulting mixture is partitioned into aqueous and organic phases after the addition of 710 parts of ether. The ethereal phase is washed with water, with 2% sodium hydroxide solution and finally with several portions of water. The ethereal phase is then distilled with steam until the ether and nitrobenzene are removed, and the gummy organic product is transferred to a distillation vessel and subjected to a fractional distillation under reduced pressure. The desired compound is collected at about 178° C. at a pressure of 0.05 mm. Further purification by crystallization of the distillate from methanol yields methyl 6-butyryldehydroabietate melting at 97–98° C.

Example 12

A solution of 3.84 parts of methyl 6-butyryldehydroabietate in 22 parts of ether is treated by the addition of a catalytic amount of hydrogen bromide in acetic acid and then, over a period of 10 minutes, by a mixture of 1.6 parts of bromine in 18 parts of ether. The reaction mixture is diluted with 50 parts of water and heated until all of the ether is removed by evaporation. The solid product is collected on a filter and washed with methanol. This product is purified by recrystallization from a mixture of chloroform and methanol, whereby there is obtained methyl 6-(α-bromobutyryl)dehydroabietate melting at 116–118° C. This compound has the structural formula

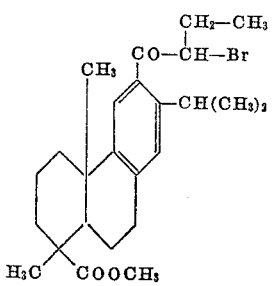

Example 13

A mixture of 30 parts of methyl 6-butyryldehydroabietate, 30 parts of potassium hydroxide, 30 parts of water, and 120 parts of ethanol is heated under reflux for 16 hours. Most of the ethanol is removed by distillation, and the remaining mixture is then diluted with water and extracted with ether. Sufficient water is added to achieve substantially complete solution of the reaction product. The aqueous phase is separated and acidified, and the gummy product which separates from solution is collected and crystallized by slow evaporation of a solution of the gum in petroleum ether. The product obtained in this manner shows the melting point behavior and carbon-hydrogen analysis indicative of a solvated material. For further purification, this product is reprecipitated several times by the addition of water to a methanol solution and finally dried in a vacuum oven. There is thus obtained 6-butyryldehydroabietic acid melting at about 159–161° C.

Example 14

A solution of 3.7 parts of 6-butyryldehydroabietic acid in 36 parts of ether is treated by the addition of a catalytic amount of hydrogen bromide in acetic acid and then, over a period of 15 minutes, with 1.6 parts of bromine. After an additional 15 minutes, 100 parts of water is added and the ether is removed by evaporation with a stream of air. The solid product which separates is collected on a filter and washed with water. The product obtained in this manner melts at about 176–178° C. and is suitable for use without further purification. This compound is 6-(α-bromobutyryl)dehydroabietic acid of the structural formula

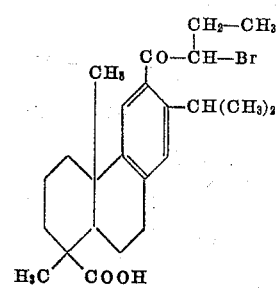

Example 15

A mixture of 4 parts of 6-(α-bromobutyryl)dehydroabietic acid, 8 parts of potassium cyanide, 8 parts of water and 48 parts of ethanol is heated under reflux for 4 hours. The cooled mixture is poured into 300 parts of water acidified with dilute hydrochloric acid, and the insoluble product is collected on a filter and washed with water. This product is reprecipitated by the addition of a filtered methanol solution to water which has been rendered faintly acidic with acetic acid. The reprecipitated product is collected and washed with water. The product is then dissolved in ether, and the ethereal solution is washed with several portions of water and then extracted with 5% sodium hydroxide solution. The alkaline extract is acidified with dilute hydrochloric acid, and the solid product is digested with portions of boiling water until the wash water is neutral. In this manner there is obtained 6-(α-cyanobutyryl)dehydroabietic acid. This compound shows infrared absorption maxima at 4.46, 5.90, 6.68, 6.86, 7.23, 7.85, 8.18, 8.78, 11.20, and 12.05 microns. It has the structural formula

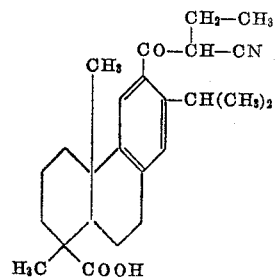

What is claimed is:
1. A compound of the structural formula

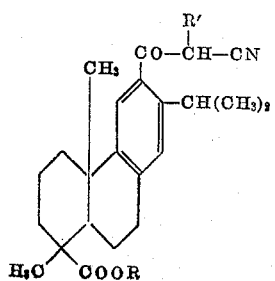

wherein R and R' are members of the group consisting of hydrogen and lower alkyl radicals.

2. A compound of the structural formula

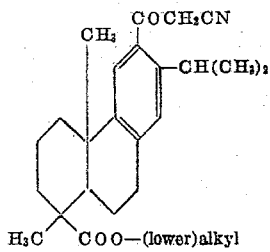

3. Methyl 6-cyanoacetyldehydroabietate.
4. Ethyl 6-cyanoacetyldehydroabietate.
5. A compound of the structural formula

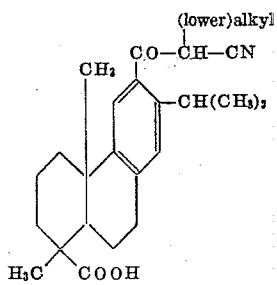

6. 6-(α-cyanobutyryl)dehydroabietic acid.
7. 6-cyanoacetyldehydroabietic acid.
8. A process for the manufacture of a compound of the structural formula

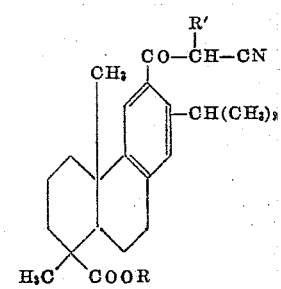

wherein R and R' are members of the group consisting of hydrogen and lower alkyl radicals, which comprises heating a solution, in a hydroxylic solvent, of an alkali metal cyanide and a compound having the structural formula

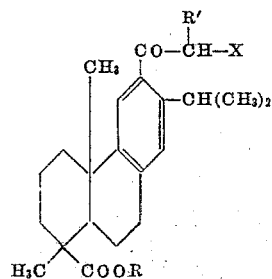

wherein R and R' are defined as hereinbefore and X is a halogen atom.

References Cited in the file of this patent

UNITED STATES PATENTS 2,472,437   Pratt _____ June 7, 1949

OTHER REFERENCES

Pratt: Jour. Amer. Chem. Soc., vol. 73, pp. 3803–7 (1951).